Figure 1:
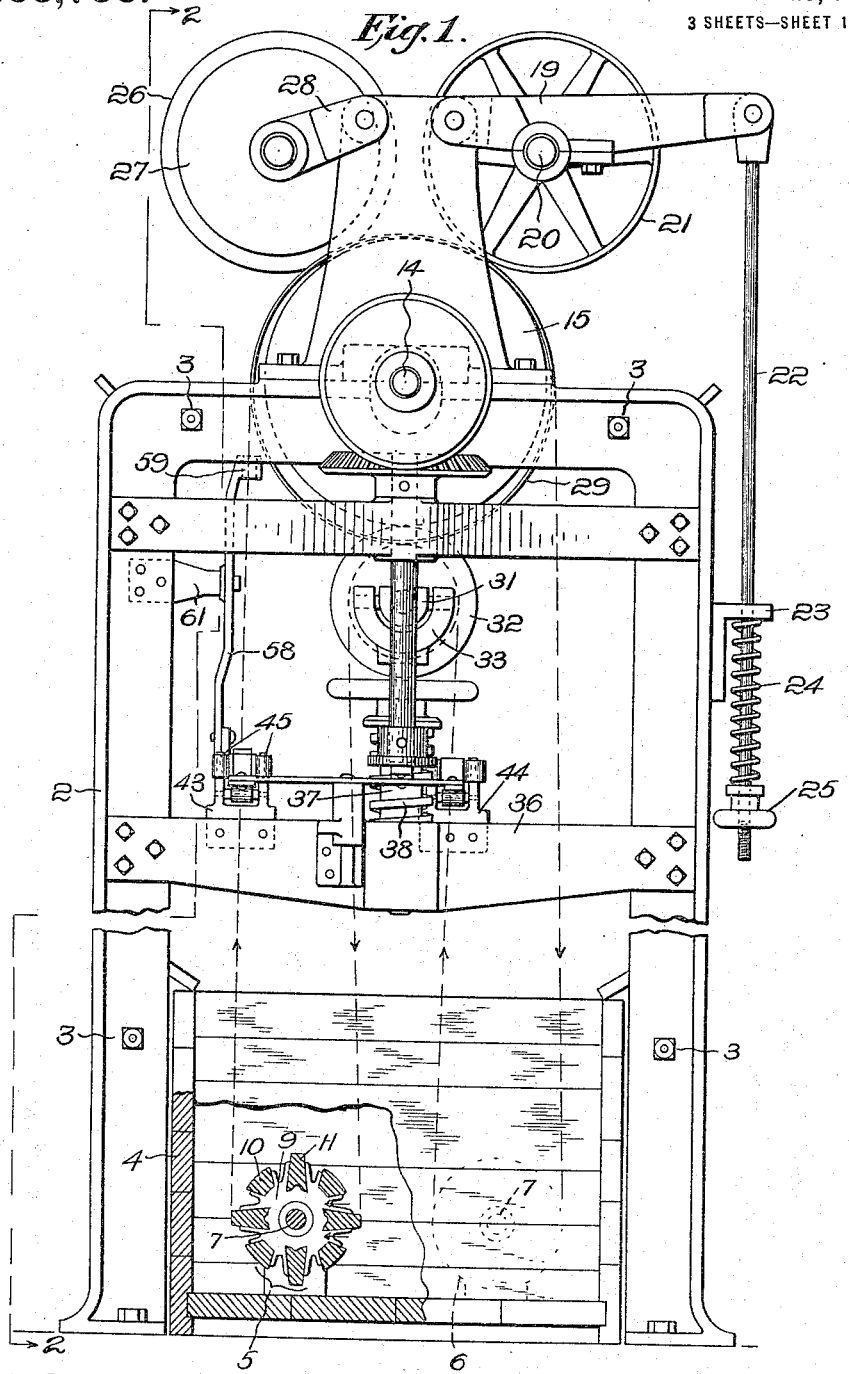

I. E. PALMER, DEC'D.
T. & N. T. PALMER, ADMINISTRATORS.
WASHING OR RINSING MACHINE FOR TEXTILE MATERIAL.
APPLICATION FILED MAR. 4, 1914.

1,168,736. Patented Jan. 18, 1916.
3 SHEETS—SHEET 1.

Witnesses:
C. C. Fuss.
Llewellyn Richards.

Inventor.
Isaac E. Palmer
by Emery, Booth, Janney & Varney
Attys.

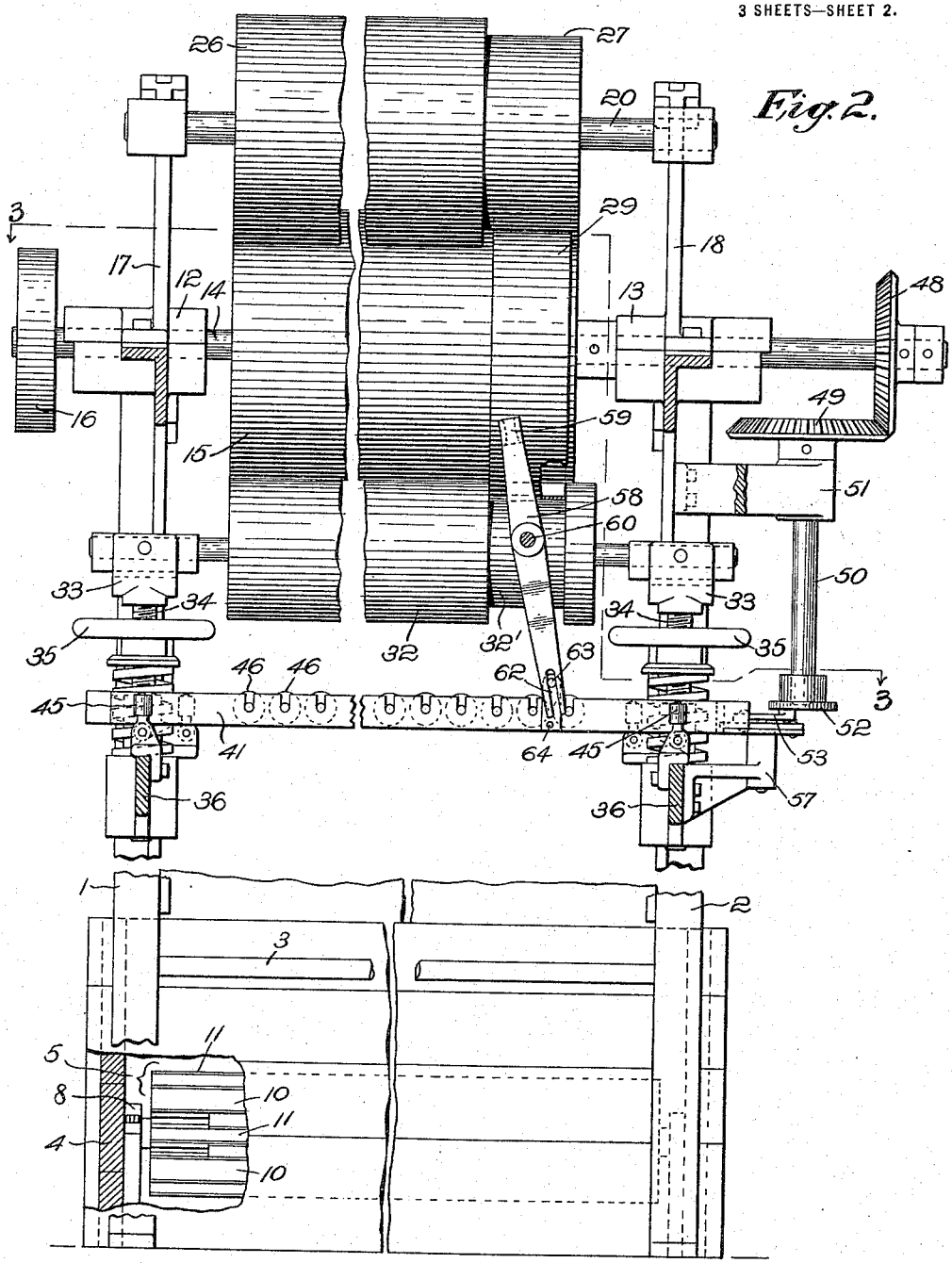

I. E. PALMER, DEC'D.
T. & N. T. PALMER, ADMINISTRATORS.
WASHING OR RINSING MACHINE FOR TEXTILE MATERIAL.
APPLICATION FILED MAR. 4, 1914.
1,168,736.
Patented Jan. 18, 1916.
3 SHEETS—SHEET 3.
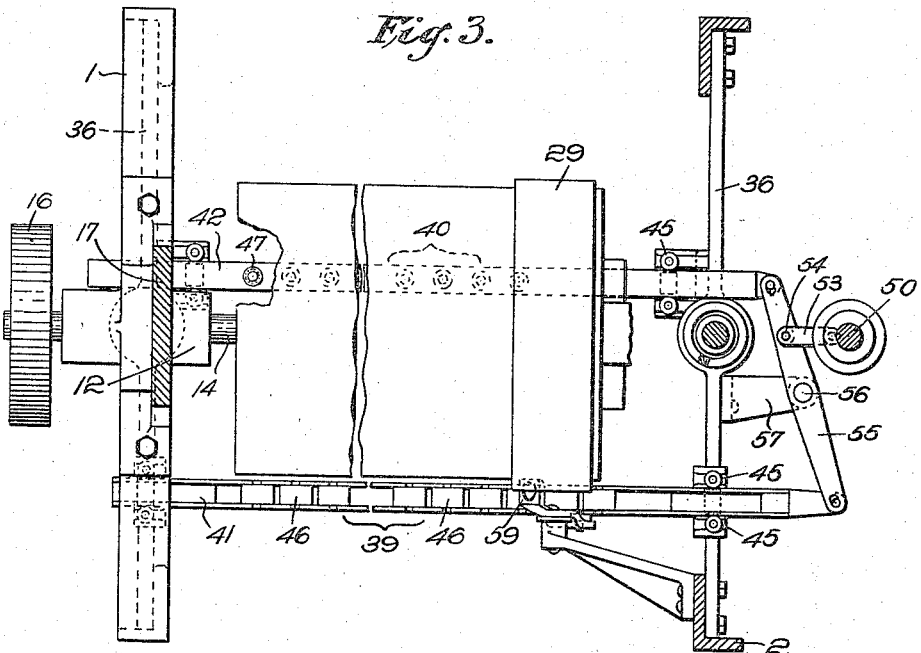
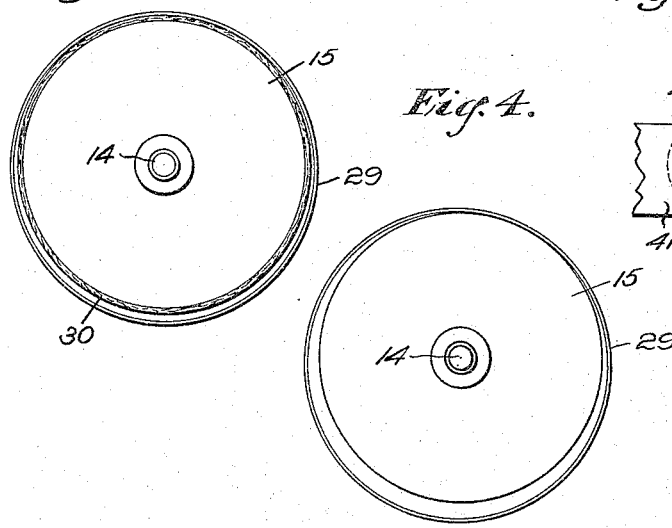
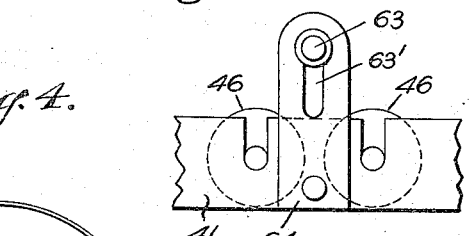
Witnesses:
C. C. Fiss.
Llewellyn Richards.
Inventor.
Isaac E. Palmer
by Emery Booth Janney Varney
Attys.

UNITED STATES PATENT OFFICE.

ISAAC E. PALMER, OF MIDDLETOWN, CONNECTICUT; TOWNSEND PALMER AND NATHALIE T. PALMER, OF MIDDLETOWN, CONNECTICUT, ADMINISTRATORS OF SAID ISAAC E. PALMER, DECEASED.

WASHING OR RINSING MACHINE FOR TEXTILE MATERIAL.

1,168,736. Specification of Letters Patent. Patented Jan. 18, 1916.

Application filed March 4, 1914. Serial No. 822,256.

*To all whom it may concern:*

Be it known that I, ISAAC E. PALMER, a citizen of the United States, and a resident of Middletown, in the county of Middlesex and State of Connecticut, have invented an Improvement in Washing or Rinsing Machines for Textile Material, of which the following description, in connection with the accompanying drawings, is a specification, like characters on the drawings representing like parts.

This invention relates to washing, rinsing or like machines for textile material, and is an improvement upon the construction shown in my Patents No. 766,464, August 2, 1904, No. 816,179, March 27, 1906, and No. 985,695, February 28, 1911, and upon that shown in my co-pending applications, Serial No. 765,516, filed May 5, 1913, and Serial No. 815,054, filed January 28, 1914.

In order that the principle of the invention may be readily understood, I have sent forth a single embodiment thereof in the accompanying drawings wherein—

Figure 1 is an end elevation of the apparatus, a portion thereof being shown in section; Fig. 2 is a view of said apparatus mainly in side elevation, but partially in section, on the line 2—2 of Fig. 1; Fig. 3 is a view partially in plan and partially in section on the line 3—3 of Fig. 2; Fig. 4 is an end elevation of the feed roll and the loose shell or sleeve mounted thereon; Fig. 5 is a view similar to Fig. 4, but representing filling material interposed between the drum and shell; and Fig. 6 is a detail of one form of means for varying the throw of one of the guides.

The apparatus herein disclosed is intended to treat material in lengths and preferably to wash or rinse material in the form of strands, ropes or bands which are passed through the apparatus in a series of spaced runs or paths preferably spaced from each other as hereinafter more fully set forth.

Referring more particularly to the drawings, the end frames of the apparatus are represented at 1, 2 in the several figures. These frames are of any suitable form, but are herein represented as generally rectangular and as connected together by tie rods 3. Within the lower portion of the frames 1 and 2 is positioned a suitable tank or vat 4 preferably having therein fluid circulating and fabric guiding rollers 5 and 6 which may be of the construction shown or of any other suitable form and construction. Herein, however, I have represented each of said rollers as provided with a shaft or axle 7 loosely mounted in suitable bearings 8. Fast upon each end of each shaft or axle 7 is a head, spider or casting 9 having peripheral recesses or sockets wherein are fixedly set bars or strips 10, 11, preferably of wood and preferably shaped substantially as shown and spaced apart so that the liquor may enter between each pair of bars on the down-turning side of the rollers and be discharged therefrom through bars, as for example, those on the upturned side. Inasmuch as the said rollers are driven by the textile material as herein set forth, the liquid is thereby circulated between the bars 10 and 11, and thus the liquid in the vat is kept in constant agitation. Preferably the bars 10 taper inwardly and the bars 11 taper outwardly as shown, and the construction is such that in whichever direction the said rollers 5 and 6 be driven, they act to circulate the liquid. Inasmuch as the said rollers act similarly upon the liquid whichever be their direction of rotation, it is possible to change or reverse the course of the material through the apparatus. Instead of the rollers 5, 6 I may provide any other suitable rollers or corresponding members.

In the upper portion of the frames 1 and 2, I provide suitable bearings 12, 13 wherein is mounted upon a shaft 14 a master feeding roller 15. Upon the shaft 14 is fast a pulley 16 driven from any suitable source of power. Upon the framing at opposite ends of the feeding roller 13, there are mounted upright brackets 17, 18, wherein are respectively mounted lever arms, one of which is indicated at 19 in Fig. 1. The said arms are provided with suitable bearings wherein is loosely mounted a shaft 20. Upon said shaft are mounted two squeeze rolls, one of which is indicated at 21 in Fig. 1, and is positioned at the exit end of the master feeding roller. Both of these feeding rollers are preferably similar to the corresponding rollers shown in my said co-pending application No. 815,054, one of said rollers being omitted for clearness of illustration of other parts. Preferably one of said rolls is loose and the other is fast upon the said shaft 20, so that they may rotate at a differential speed with respect to each other, if this be required by the tension of different portions of the material. Preferably the squeeze roll 21 is fast and the other is loose upon the shaft 20, though this condition may be reversed if desired. Preferably also each of said squeeze rolls is faced with rubber. In order to hold the said squeeze rolls yieldingly against the master feeding roller 15, any suitable means may be provided. I have herein represented a lever arm 19 as having pivotally connected thereto a rod 22 extending downwardly and passing loosely through a bracket 23 upon the framing, the said rod being surrounded below said bracket by a coil spring 24, the tension whereof may be adjusted by nuts 25 upon the threaded lower end of said rod. Preferably a similar means is provided at the opposite end of the shaft 20, as will be readily understood without further description and disclosure.

It will be observed that in the disclosed embodiment of the invention the squeeze rolls mounted upon the shaft 20 are located at one side of a vertical plane passing through the axis of the feeding roller 15. At the other side of the said vertical plane is positioned a rider roll 26, which, as indicated in Fig. 2, is preferably of substantially the same length as the master feeding roller 15, but has a terminal portion 27 of reduced diameter, as indicated in Figs. 1 and 2. The said rider roll 26 is supported upon arms 28 permitting it to rest by gravity against the master feeding roller 15 and permitting it to yield to inequalities in the material passing through the apparatus. Upon the master feeding roller 15 I mount one or more loose shells, rings or sleeves, one only of which is indicated at 29 in the several figures of the drawing. The said shell, ring or sleeve, and which I shall hereinafter term a shell, is represented as mounted at the exit or discharge end of the feeding roller 15, though within the scope of my invention I may employ such a shell at both the entrance and the discharge ends of said feeding roller and even at other parts thereof. Preferably, however, said shell is employed only at the discharge end of the feeding roller 15. The said shell is of any suitable material, such, for example, as brass or other metal or rubber. It is of materially greater diameter than the diameter of the feeding roller, as will be evident from Figs. 1 and 4, so that it assumes the position shown in said figures. Preferably the shell is thin, so that at its upper portion where it contacts with the squeeze roll 21, it protrudes but slightly beyond the surface of the said feeding roller. If desired, the latter may be slightly recessed to receive said sleeve, so that in one condition of operation the surfaces of the roller and sleeve may be flush at the point of engagement of said shell with the squeezing roller 21.

As indicated in Fig. 5, I may interpose any suitable quantity of filling or packing material 30 between the feeding roller 15 and the shell 29 so as to increase the diameter of said roller, thereby elevating the said shell at its point of contact with the squeezing roller 21, and thus increasing the speed of the material passing over the shell. Such filling or packing material may be of any suitable character and may be wrapped any suitable number of times about the adjacent surface of the feeding roller 15. Any other suitable means may be provided to increase or vary the effective diameter of the feeding roller, and hence of the shell 29.

At a suitable point operatively between the liquid circulating rollers 5, 6 and the feeding roller 15, and preferably centrally beneath the feeding roller 15, I have loosely mounted in suitable bearings 31 the tensioning and tension-reversing roller 32, which may, under certain conditions, act also as a squeezing roller as hereinafter set forth. The said roller, as indicated in Figs. 1 and 2, is preferably circumferentially recessed at 32' to receive the shell 29 and to maintain the same in proper position upon the feeding roller 15.

As indicated most clearly in Figs. 1 and 2 each of the bearings of the roller 32 is substantially of U-shape and each is supported by a yoke 33 having a depending, threaded spindle or extension 34 passing through the hand nut 35. The lower ends of said spindles or extensions are preferably received in sockets in cross girts 36 having sleeves 37 to receive said spindles. Between each cross girt and its co-acting nut 35 is positioned a coil spring 38, whereby the roll 32 is yieldingly supported to compensate for inequalities or irregularities in the material passing thereover. Any other suitable adjusting means may be provided for the roller 32. In the manner described or in any other suitable way the said roller may be adjusted toward and from the feeding roller 15, so that the material passing about said roller 32 may be squeezed between it and the feeding roller 15, as indicated in Fig. 1, or so that that portion of the material passing about the roller 32 does not contact with the said feeding roller 15. When the roller 32 is positioned as indicated, it acts as a squeezing roller as well as a tensioning and tension-reversing roller. Moreover when the roller 32 is adjusted to the position shown, it is positively driven from the surface of the feeding roller 15 of which is of great advantage in the handling of light goods, which otherwise might be unduly stretched. With heavy goods, however, the roller 32 may be rotated merely by the material passing thereabout. Furthermore certain conditions of operation require a squeezing of the material at this point so as substantially to remove the liquid therefrom.

The material, which, as previously stated, is preferably in bands, ropes or strands, is introduced at one end of the apparatus and is passed therethrough in the desired course, which may be varied in accordance with the particular requirements of the goods to be treated. For purposes of description, it will be assumed that the material is introduced at the left hand end viewing Fig. 3, it thus passing between the feeding roller 15 and the adjacent end of the squeezing roller 26 and the adjacent roller referred to as mounted upon the shaft 20. The material may then be passed once about the feeding roller 15, but preferably it is passed directly downward substantially vertically as indicated by dotted lines in Fig. 1 about the liquid circulating roll 6, is then passed directly upward about the roller 32, thence directly downward about the liquid circulating roll 5, and thence directly upward and again about the feeding roller 15 at a point slightly or sufficiently spaced from the first contact of the material with said roller. The material is then passed through the described circuit repeatedly any suitable number of times and is finally discharged from the apparatus between the shell 29 and the recessed end 27 of the squeezing roller 26.

I contemplate the provision of means to guide the material in its several runs or paths through the apparatus and to shift said paths or runs transversely of the feeding roller 15. An important object effected thereby is the evenness of wear of the material upon the feeding roller 15, inasmuch as preferably I impart sufficient to and fro movement to the material so that all portions of the feeding roller 15 at some time or times are in contact with the material. Thus I avoid all tendency of the material to wear grooves or to form ridges in the feeding roller. While I may effect this result in any suitable manner, I have herein for the purpose represented two series of guides indicated generally at 39, 40. As herein shown, I provide two slides 41, 42, which are mounted in suitable brackets 43, 44 upon the cross girts 36. Each of said brackets is provided with suitable friction reducing guides 45, whereby the to and fro movement of the slides 41, 42 is facilitated. Upon the said slides 41, 42 I mount a number of guiding members corresponding to the number of paths or runs of the material, and between which the said material is guided. These guiding members may be of any suitable character. I may employ guiding rollers or pot eyes or any other suitable device. For simplicity of illustration I have represented the slide 41 as composed of two parallel bars or pieces having loosely mounted therebetween a series of freely rotatable guide rolls 46, and I have represented the slide 42 as having a corresponding series of pot eyes 47. It will be understood, however, that both slides may be equipped either with rolls or pot eyes or any other suitable guiding device. In either illustrated form and preferably the material is confined either in the pot eye or between the rolls and the parallel bars of the guides, so that it will be positively moved along the feeding roller 15 with the said slides.

Any suitable means may be provided to impart to and fro movement to the slides 41, 42. For this purpose I have herein represented the shaft 14 of the feeding cylinder 15 as having thereon a bevel gear 48 meshing with a similar gear 49 upon an upright shaft 50 mounted in bearings in the bracket 51 and having at its lower end a crank disk 52 to which is suitably pivoted a crank arm 53 pivoted at 54 to one arm of a lever 55 itself pivoted at 56 upon a suitable bracket 57 upon the framing of the apparatus. The lever 55 at its opposite ends is connected to the slides 41, 42, whereby said slides are reciprocated longitudinally of the feeding cylinder 15 and traverse the material to and fro therealong, as previously described. The extent of movement of said slides may be varied in any suitable manner, as by adjustment of the crank arm 53.

Preferably I provide a guide for the material in substantial proximity to the shell 29, so that at this point the material may be directly and positively shifted transversely of said shell. For this purpose, I have herein represented in Figs. 1 and 2, a lever 58 having at its upper end a guide eye 59. The said lever is pivoted at 60 upon a suitable bracket 61 upon the framing, and at its lower end it is connected to the slide 41 and preferably in such manner that the throw of the said lever may be varied. For this purpose I have herein represented the lower end of said lever 58 as slotted at 62. In said slot is received a pin 63 adjustable in slot 63' in a stud or bracket 64 upon said slide 41. By vertical adjustment of said pin 63 in stud 64, the throw of the lever 58 is varied. Preferably, however, the throw of said lever is sufficient to traverse the material the entire width of the said shell 29.

Viewing Fig. 1, it will be observed that the guides 39, 40 engage the material at the upward runs thereof only. They thus not only control the material passing about the feeding roller 15 and traverse it therealong as described, but they also traverse it correspondingly along the roller 32. It is unnecessary to provide guides for the descending runs of the material, though this may be done within the scope of my invention.

It will be observed that the apparatus herein represented is provided with a single positively driven roller, namely the feeding roller 15 which constitutes a master roller controlling and determining the passage of the material through the apparatus. All the other rollers are driven by draft of the material, excepting when the roller 32 is so adjusted as to establish a squeezing relation between it and the said master feeding roller 15. Thus no undue tension is imparted to the material, and the tension thereof may be very carefully controlled throughout its entire course. The roller 32 positioned as it is at a considerable elevation above the liquid circulating rolls 5 and 6, reverses the tensioning of the material that occurs when the latter has passed about said liquid circulating rolls. In other words, by passing the material up and over the roller 32, that portion of the goods under treatment which was outside in passing around the roller 6 is at the inside on the roller 32, and thus the outer and inner parts of the material are at intervals returned to their normal relations without undue stretching of one portion with respect to the other. Conversely the portion of the material which is outside in passing around the roller 32 is at the inside when it passes about the squeeze roll 5, and thus the stretch is again reversed.

Obviously the roller 32 may be adjusted at either or both ends thereof, and it acts as a tensioning roller to impart a direct stretching to the material as well as to reverse the tension thereof, as previously stated, and as described it acts as a squeezing roller when moved sufficiently toward the feeding cylinder 15.

In the manner described or in any other suitable manner, the speed of the material through the apparatus may be varied and the wear of the material not only upon the feeding roller 15 but also upon the feeding roller 32 is lessened.

Having thus described one illustrative embodiment of my invention, I desire it to be understood that although specific terms are employed, they are used in a generic and descriptive sense and not for purposes of limitation, the scope of the invention being set forth in the following claims:

1. A washing or rinsing apparatus comprising in combination, a tank, a master feeding roller located above the tank and over which the material is adapted to pass, a roll supported adjacent said feeding roller and over which the material is also adapted to pass, and means to adjust the bearings of said second roll, so that the material passing over said roll may be squeezed between it and said feeding roller or may pass therebetween in unsqueezed condition.

2. A washing or rinsing apparatus comprising in combination, a tank, a master feeding roller located above the tank and over which the material is adapted to pass, a roll supported below the feeding roller and over which the material is also adapted to pass, and means vertically to adjust the bearings of said roll so that the material passing thereover may be squeezed between it and said feeding roller or may pass therebetween in unsqueezed condition.

3. A washing or rinsing apparatus comprising in combination, a tank, a master feeding roller over which the material is adapted to pass, a roller adjacent the feeding roller and over which the material is also adapted to pass, adjustable bearings for said roll, and means yieldingly to support said adjustable bearings, whereby the material passing over said roll may be yieldingly squeezed between it and said feeding roller or may pass therebetween in unsqueezed condition.

4. A washing or rinsing apparatus comprising in combination, a tank, a master feeding roller located above said tank, a loose shell mounted upon said roller, a support having a series of guides to direct the material in a corresponding series of spaced paths or runs about said feeding roller, a movable guide adjacent said shell, connections between said movable guide and said support, and means to impart to and fro movement to said support.

5. A washing or rinsing apparatus comprising in combination, a master feeding roller located above the tank, rolls located within the tank and about which the material passes, a loosely mounted tensioning and tension-reversing roll located in proximity to said master feeding roller and adapted to receive the material from one of said tank rolls and deliver it to the other, and means to move said tensioning roll into squeezing relation to said master feeding roller.

6. A washing or rinsing apparatus comprising in combination, a master feeding roller located above the tank, rolls located within the tank and about which the material passes, a loosely mounted tensioning and tension-reversing roll located in proximity to said master feeding roller and adapted to receive the material from one of said tank rolls and deliver it to the other, means to move said tensioning roll into squeezing relation to said master feeding roller, and means to direct the material in a series of spaced paths or runs to said master feeding roller and to said tensioning roll.

In testimony whereof, I have signed my name to this specification, in the presence of two subscribing witnesses.

ISAAC E. PALMER.

Witnesses:
THOS. W. HALLORAN,
CHAS. M. SAUER.

Copies of this patent may be obtained for five cents each, by addressing the "Commissioner of Patents, Washington, D. C."